Patented June 12, 1923.

1,458,308

UNITED STATES PATENT OFFICE.

PURL C. PLASTERER, OF HAMILTON, OHIO, ASSIGNOR TO DARN E. Z. LABORATORYS, OF DAYTON, OHIO, A PARTNERSHIP CONSISTING OF PURL C. PLASTERER, KARL M. HORNE, AND JAMES A. HOPKINS.

CEMENT.

No Drawing. Application filed March 11, 1921. Serial No. 451,631.

*To all whom it may concern:*

Be it known that I, PURL C. PLASTERER, a citizen of the United States, and a resident of Hamilton, in the county of Butler and State of Ohio, have invented a certain new and useful Cement, of which the following is a full, clear, and exact description.

My invention relates to cement, particularly for use in cementing one piece of cloth to another, the requisites of which cement are great adhesiveness and freedom from melting at temperatures of boiling water.

It often occurs that garments which have been patched, or other articles which have been cemented together are washed or boiled in water, and most cements of which I have knowledge, which are suitable for such purposes, will not withstand the heat of boiling water.

It is the object of my invention to provide a cement which will retain its hardness and adhesiveness, even though subjected to boiling, and in addition is very strong and permanent.

I accomplish my object by that certain process of manufacture and composition to be hereinafter more specifically pointed out and claimed, wherein, among other things, I employ gum arabic, in connection with a cement formula, which gives me the desired qualities and without which, the desired qualities are not substantially present.

Thus I proceed according to one method of manufacture on the following basis. I mix together finely chopped india rubber 100 parts, commercial rosin 15 parts, and commercial brown shellac 10 parts and add sufficient carbon disulphide to dissolve the said mixture.

I then mix up for 1½ pints of the above mixture, one ounce avoirdupois of gum arabic, otherwise known as gum acacia dissolved in 1½ pints of commercial benzine. The benzine is maintained at about 120 degrees Fahrenheit during the dissolving of the gum arabic, and added while still hot to the first mixture above noted.

The product is then agitated and permitted to stand for a period of say two weeks, or until the carbon disulphide and gum arabic and benzine have thoroughly digested the rubber, rosin and shellac mixture, the agitation being kept up from time to time.

At the end of this period, the product is passed or forced through a fine mesh screen and is ready for use, being in the form of a stiff paste, which is to be spread on the articles to be cemented, in any desired manner.

I have found that when the material prepared as above is used, it will withstand boiling in water and is very hard and tenacious.

In referring to benzine I wish to include other petroleum refined products having a high gravity test.

Having thus described by invention, what I claim as new and desire to secure by Letters Patent, is:—

A cement consisting or rubber digested together with commercial rosin and commercial brown shellac into a semi-solid by means of carbon disulphide, and gum arabic dissolved in benzine, said ingredients digested together to form a thick paste.

PURL C. PLASTERER.

Certificate of Correction.

It is hereby certified that the name of the assignee in Letters Patent No. 1,458,308, granted June 12, 1923, upon the application of Purl C. Plasterer, of Hamilton, Ohio, for an improvement in "Cement," was erroneously written and printed as "Darn E. Z. Laboratorys," whereas said name should have been written and printed as *Darn E. Z. Laboratory*, as shown by the records of assignments in this office; and that the said Letters Patent should be read with this correction therein that the same may conform to the record of the case in the Patent Office.

Signed and sealed this 17th day of July, A. D., 1923.

[SEAL.]

WM. A. KINNAN,
*Acting Commissioner of Patents.*